March 9, 1926.
A. W. SPENCE
1,575,943
DUMP TRUCK
Filed Feb. 15, 1924
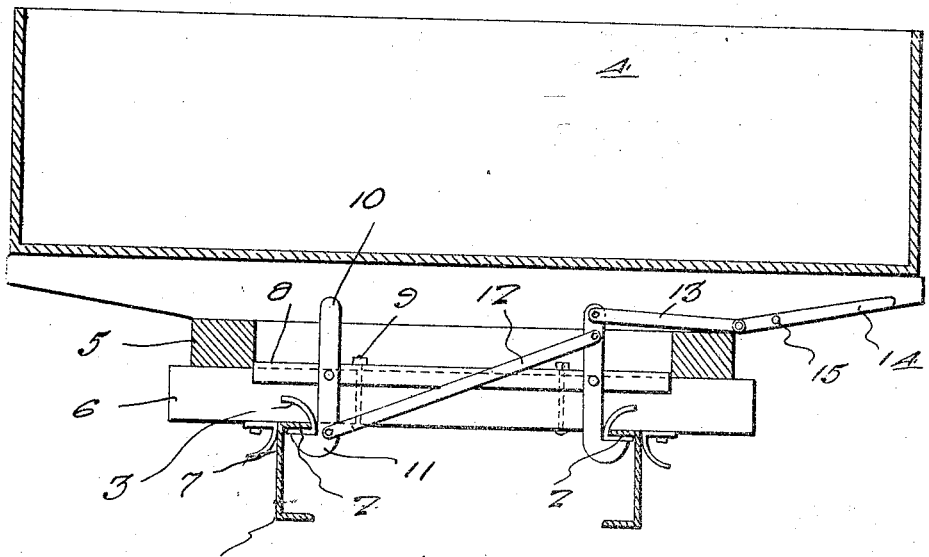
Fig. 1.
Fig. 2.
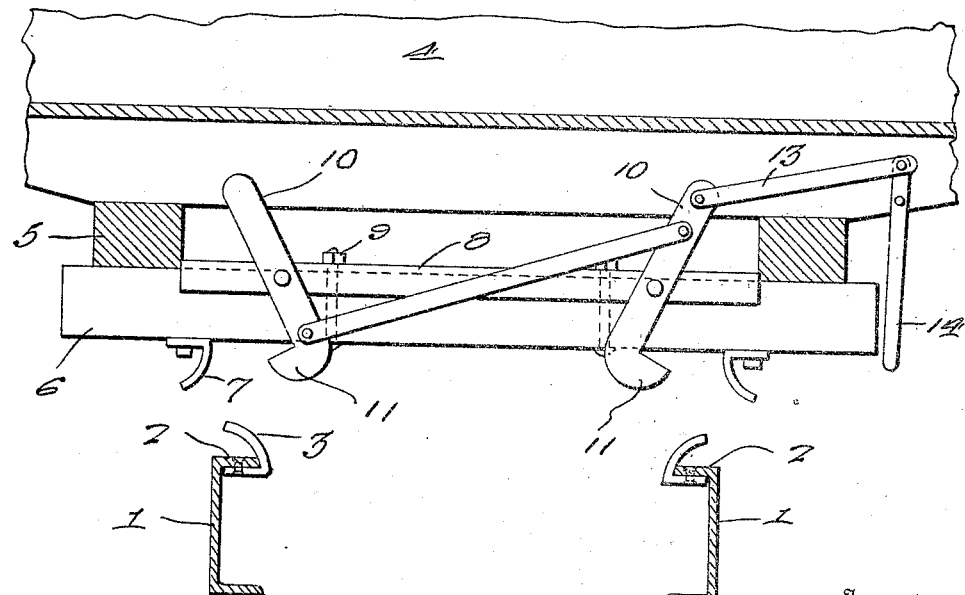

Patented Mar. 9, 1926.

1,575,943

UNITED STATES PATENT OFFICE.

ARTHUR W. SPENCE, OF ASSUMPTION, ILLINOIS.

DUMP TRUCK.

Application filed February 15, 1924. Serial No. 693,037.

*To all whom it may concern:*

Be it known that I, ARTHUR W. SPENCE, a citizen of the United States, residing at Assumption, in the county of Christian and State of Illinois, have invented certain new and useful Improvements in Dump Trucks, of which the following is a specification.

This invention relates to dump trucks and includes the novel features hereinafter described and claimed.

An object of the invention is to provide a latch device of simple and durable structure adapted to be applied to the body of a dump truck and which serves to retain the body of the truck in a lowered position upon the frame of the vehicle which carries the body, means being provided for operating the parts of the latch mechanism to release the body in order that it may be tilted from a load carrying position to a load dumping position.

With this object in view, the structure includes means upon which the body of the truck is mounted. The means are pivotally connected with cross bolsters and the bolsters are adapted to rest upon the side rails of the frame of the vehicle which carries the body, cleats being provided and attached to the bolsters for directing them in position upon the side members of the frame of the vehicle. A cross bar is mounted upon one of the beams with its ends against the inner surfaces of the beams which are disposed longitudinally of the body. Hooks are pivoted upon the cross bar and adapted to engage under the flanges on the side rails of the frame of the motor vehicle. A link operatively connects the hooks together so that their bill end portions move simultaneously toward each other and in a similar manner away from each other. A link is connected with one of the hooks. A lever is fulcrumed under the floor of the body and is operatively connected with the outer end portion of the last mentioned link. By swinging the lever, the hooks may be swung so that their bill end portions may disengage from under the flanges of the side rails of the frame of the motor vehicle.

In the accompanying drawing:

Figure 1 is a transverse sectional view of the body of the dump truck and the upper portion of the frame of the vehicle upon which the body is mounted.

Figure 2 is an enlarged similar view showing the relative location of the parts when the bill ends of the hooks are disengaged from under the flanges of the side rails of the frame of the motor vehicle.

As illustrated in the accompanying drawing, the side pieces of the frame of the vehicle are indicated at 1, and these side pieces or rails are provided at their upper edges with inwardly disposed flanges 2. Pairs of guide members 3 are mounted upon the flanges 2 and have their curved portions disposed above the upper surface of the said flanges. The upper inner surfaces of the said guide members 3 are downwardly and inwardly inclined and they serve to direct the bill ends of hooks hereinafter to be described under the flanges 2 when the body of the vehicle is lowered from a tilting position to a load receiving position from the side rails 1.

The body of the vehicle is indicated at 4, and this body is mounted in a usual manner for tilting movement upon the frame of the motor vehicle of which the side rails 1 are component parts. Longitudinally exposed beams 5 are disposed under the bottom of the body 4 and are mounted upon transversely disposed bolsters 6. One bolster is provided at its lower side with curved cleats 7 which are adapted to move along the upper outer edges of the side rails 1 of the frame of the motor vehicle and guide the bolster and the body to load receiving position upon the frame of the motor vehicle. A bar 8 is secured by means of bolts 9 from the upper portion of the bolster 6 and the ends of the bar are in contact with the inner surfaces of the beams 5. Hook members 10 are pivoted upon the bar 8 and their bill ends 11 are adapted to encounter the guides 3 and engage under the upper flanges of the side rails 1 when the body 4 is moved to a load receiving position. A rod 12 is pivotally connected at one end to one of the hooks 10 in the vicinity of the bill end 11 thereof and at its other end is pivotally connected to the shank portion of the other hook whereby the said rod 10 lies in an inclined position across a horizontal line which passes through the axes of the pivots of the hooks 10. A link 13 is pivotally connected at one end to the other end portion of one of the hooks 10 and is pivotally connected at its outer end to the shorter end of the lever 14, which is fulcrumed at a point 15 and which is located at the bottom of the body 4. When the outer end of the lever 14 is moved to an upper position as shown in Figure 1 of the drawings, the bill ends 11 of the hooks 10 are engaged under the upper flanges of the side rails 1 of the frame of the motor vehicle. Therefore, the body 4 is secured in a load receiving position upon the frame of the motor vehicle. When it is desired to tilt the body 4 with respect to the frame of the motor vehicle, of which said side rails 1 are a component part, the outer end portion of a lever 14 is swung downwardly and to a position as shown in Figure 2 of the drawing, whereby the link 13 is moved longitudinally and through the instrumentality of the connecting rod 12 the hooks 10 are swung simultaneously, whereby both of their ends 11 are disengaged from under the flanges of the side rails 1. When thus disconnected, the body 4 may be moved from the load receiving position to a load dumping position.

Having described the invention, what is claimed is:

In combination with a vehicle frame provided with flanges, a body mounted for movement relative to the frame, hooks pivotally mounted at points between their ends upon the body and adapted to engage under the flanges of the frame, a rod pivotally connecting the hooks on opposite sides of their fulcrums for causing them to swing simultaneously toward and away from each other, a link connected to one of the hooks, and a lever pivoted intermediate its ends upon the body and operatively connected with the link.

In testimony whereof I affix my signature.

ARTHUR W. SPENCE.